INVENTORS
FORD A. RICE
BY ALBERT E. RICE

ATTORNEYS

United States Patent Office 3,075,232
Patented Jan. 29, 1963

3,075,232
CASTER
Ford A. Rice and Albert E. Rice, both of
552 Leader Bldg., Cleveland, Ohio
Filed Jan. 16, 1961, Ser. No. 82,943
2 Claims. (Cl. 16—18)

This invention relates generally to casters, but has reference more particularly to casters of the spherical or ball type, as shown, for example, in U.S. Patent No. 2,539,108.

A primary object of the invention is to provide a caster of the character described which consists of a minimum number of parts which can be quickly and easily assembled.

Another object of the invention is to provide a caster of the character described which is of extremely simple construction, such that it can be manufactured in commercially large quantities, at low cost, and sold at a relatively low price.

A further object of the invention is to provide a caster of the character described which is of a construction conducive to preclude the entry of threads, dust and dirt into the interior of the caster, thereby reducing internal wear of the rotating parts to a minimum.

Other objects and advantages of our invention will be apparent during the course of the following description.

In the accompanying drawings forming a part of this specification, and in which like numerals are employed to designate like parts throughout the same, FIG. 1 is an elevational view of one side of the caster, with portions broken away to better illustrate the construction;

Figure 1:
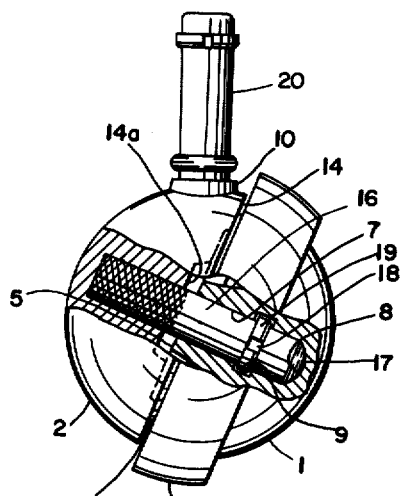

Referring more particularly to the drawings, the caster is seen to comprise a rotary floor engaging element 1, of substantially solid hemispherical form, and a body or supporting element 2, also of substantially solid hemispherical form, the elements 1 and 2, when joined, forming a substantially solid sphere or ball.

The element 1 is provided with a spherical segmental protuberance 3 which is inclined to the vertical axis of the sphere and forms a tread which engages the floor at all times during use of the caster.

The element 1 is also provided with an annular recess 4, for a purpose to be presently described, and with a central hub 5, which extends axially from the element 1 and in a direction substantially perpendicularly to the plane of the protuberance 3.

Extending through the hub 5 and to a point within the element 1 closely adjacent the spherical surface 6 of the element 1 is a bore 7 having a rounded bottom 8 and an annular recess or groove 9 in its side wall. The axis of the bore 7 is inclined to the vertical axis of the caster.

Figure 3:
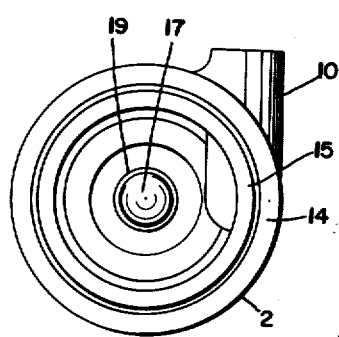
FIG. 3 is a side elevational view of the body or supporting element of the caster.
Figure 4:
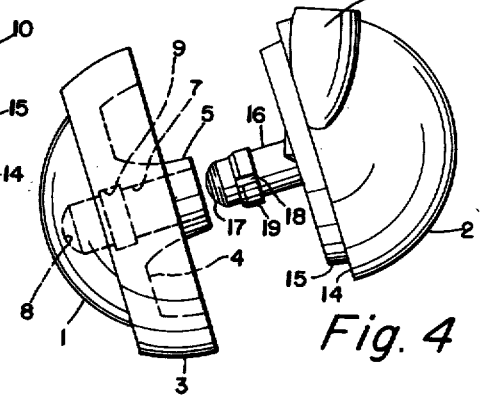
FIG. 4 is an exploded view of the parts.

The element 2 is provided with a portion 10, which, as best shown in FIG. 3, extends upwardly and substantially tangentially to the element 2 and is formed or cast integrally therewith, this portion 10 having a bore 11 therein, which has a rounded bottom 12, and an annular recess or groove 13 in its side wall.

Figure 2:
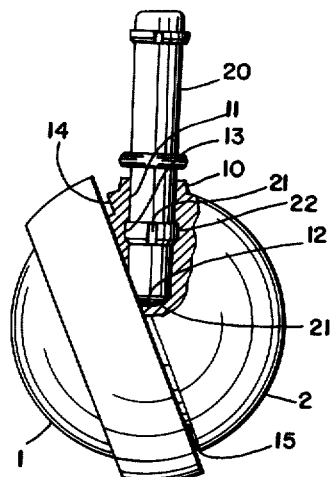
FIG. 2 is an elevational view of the other side of the caster, with portions broken away to better illustrate the construction.

The element 2 is also provided on its flat face 14 with an annular flange 15, which forms a thread guard, and which, when the elements 1 and 2 are assembled, extends into the recess 4 of the element 1, as best shown in FIGS. 1 and 2.

The element 2 is further provided with an axle or shaft 16, which may be made of steel or similar material, and which is preferably cast into the element 2 when the latter is molded or cast, whereby the axle is rigidly secured to the element 2 and is not rotatable within the element 2.

The axle or shaft 16 extends centrally from the element 2, perpendicularly to the flat face 14, and has a rounded end 17, which is adapted to bear against the rounded bottom 8 of the bore 7, so that the bottom 8 provides, in effect, an end thrust bearing for the axle 16.

The axle 16 is provided adjacent its lower end with an annular recess or groove 18, in which a split ring 19 is disposed, for a purpose to be presently described.

The axis of the bore 11, it may be noted, is not only offset horizontally from the axis of the shaft 16, but is also inclined to the latter, as is customary in this type of caster.

The caster further includes a stem 20, preferably of steel, which is adapted to be attached to an article of furniture or the like, and is provided with a rounded lower end 21, which is adapted to bear against the rounded bottom 12 of the bore 11, so that the bottom 12 provides, in effect, an end thrust bearing for the stem 20.

The stem 20 is provided with an annular recess or groove 21, in which a split ring 22 is disposed, for a purpose to be presently described.

In the assembly of the elements 1 and 2, the axle or shaft 16 is inserted into the bore 7 of the element 1, and during this assembly, the split ring 19 is contracted slightly by the wall of the bore 7, and then expands to enter the groove or recess 9, when the parts are in the relative position shown in FIGS. 1 and 2, thereby locking the elements 1 and 2 against axial displacement from each other. The split ring 19 fits loosely in the recess 9, so as not to interfere with the free rotation of the element 1.

The element 2 may be provided in its flat face 14 with a recess 14a, to receive or accommodate the end of the hub 5.

In the assembly of the stem 20 with the element 2, the stem is inserted into the bore 11 of the element 2, and during this assembly, the split ring 22 is contracted slightly by the wall of the bore 11, and then expands to enter the groove or recess 13, when the parts are in the relative position shown in FIGS. 1 and 2, thereby locking the stem and element 2 against displacement from each other. The split ring 22 fits loosely in the recess 13, so as not to interfere with the free rotation of the element 2 about the axis of the stem 20.

The elements 1 and 2 may be made of a plastic, or in the form of metal die castings, and in order to facilitate rigid securement of the axle 16 to the element 2, when the axle is cast into the element 2, the exterior surface of the axle 16 may be knurled or otherwise roughened.

If desired, the axle or shaft 16 may be made as a separate part which can be removably secured to the element 2, as by threading it into a threaded bore of the element 2, or it may be inserted in the bore and peened to the element 2, so as to be locked against displacement from the latter.

It is thus seen that we have provided a caster which, in essence, is made of only four parts, namely, the elements 1 and 2, the shaft 16, and the stem 20, which parts can be quickly and easily assembled by means of the lock springs which have been described.

The caster is of extremely simple construction, such that it can be manufactured in commercially large quantities, at low cost, and sold at a relatively low price.

Its solid construction, and the presence of the guard flange 15, are such as to preclude the entrance of threads, dust and dirt into the interior of the caster, thereby reducing internal wear of the rotating parts to a minimum.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In a caster of the character described, a rotary floor-engaging element of substantially solid hemi-spherical form and having a spherical inclined segmental protuberance providing a tread adapted to engage a floor, said protuberance having end surfaces which lie in parallel flat planes, said element having a central hub which extends axially and in a direction substantially perpendicular to said parallel flat planes, and to a point beyond one of said planes, said hub being surrounded by an annular recess of relatively shallow depth, said hub having an axial bore therein, the wall of said bore having an annular groove therein intermediate the ends of said bore, said groove having flat side walls perpendicular to the axis of said bore, and means for supporting said element, said supporting means comprising a second element of substantially solid hemispherical form and complementary with said first-named element to form substantially a complete solid sphere, said second named element being substantially solid throughout and having an inclined flat face which is substantially parallel with the end surfaces of the protuberance of said first-named element and is disposed closely adjacent said one of said planes, said second-named element having an annular flange extending from said flat face and into said recess, said second-named element having a central recess of relatively small diameter not substantially in excess of the external diameter of the end of said hub, and of relatively shallow depth and having a bottom disposed in a plane parallel with said flat face, said central recess adapted to receive the end of said hub, said second-named element having an axle secured therein and extending into said bore, the portion of said axle which extends into said bore having an annular recess therein in confronting relationship to said groove, and means for locking said axle to said first-named element, said locking means comprising a split ring mounted in said recess and extending into said groove, said ring having a bevel end surface, adapted when the ring enters said bore to engage the side wall of said bore to cause said side wall to contract the ring, whereby entrance of the ring into the bore is facilitated, said ring having a flat surface at the end opposite said bevel end surface, said flat surface adapted to engage one of the flat side walls of said groove when the elements are completely assembled, whereby said one of said flat side walls of said groove acts as an abutment for said flat surface of the ring, to thereby preclude removal of said first-named hemispherical element from said axle, said annular flange providing a thread guard adapted to preclude entrance of threads, dust and dirt into the interior of the caster, and the depth of said annular recess of said first-named element and said central recess of said second-named element being a minimum, whereby to reduce the internal hollow space within the caster to a minimum and thereby prevent any substantial accumulation of said threads, dust and dirt in said hollow space.

2. A caster, as defined in claim 1, in which said second-named element is provided with a portion extending substantially tangentially thereto and having a vertical bore therein which is provided in its wall with an annular groove having a flat side wall at its upper end, said side wall being perpendicular to the axis of said bore, a stem extending into said vertical bore, said stem having an annular recess therein in confronting relationship to said groove, and means for locking said stem to said second-named element, said locking means comprising a split ring mounted in said recess and extending into said groove said ring having a bevel lower end surface adapted when the ring enters said vertical bore to engage the side wall of said bore to cause said side wall to contract the ring, whereby entrance of the ring into the bore is facilitated, said ring having a flat surface at its upper end which is adapted to engage said side wall of said groove when the stem and said second-named element are assembled, whereby said flat side wall of the groove acts as an abutment for said flat surface of the ring, to thereby preclude removal of said second-named element from said stem.

References Cited in the file of this patent

UNITED STATES PATENTS

| 502,686 | Tilton | Aug. 1, 1893 |
| 2,539,108 | Shepherd | Jan. 23, 1951 |
| 2,847,696 | Kramcsak | Aug. 19, 1958 |

FOREIGN PATENTS

| 278,881 | Switzerland | Feb. 16, 1952 |